United States Patent [19]
Beatty

[11] Patent Number: 5,788,154
[45] Date of Patent: Aug. 4, 1998

[54] METHOD OF PREVENTING CAVITATION IN A FUEL INJECTOR HAVING A SOLENOID ACTUATED CONTROL VALVE

[75] Inventor: David J. Beatty, Normal, Ill.

[73] Assignee: Caterpillar Inc., Peoria, Ill.

[21] Appl. No.: 642,034

[22] Filed: May 2, 1996

[51] Int. Cl.$^6$ .................................................. F02D 1/16
[52] U.S. Cl. ................................................ 239/5; 239/124
[58] Field of Search ....................... 239/5, 533.1, 533.2, 239/533.3, 533.4, 533.5, 533.9, 124, 126, 88, 89, 90

[56] References Cited

U.S. PATENT DOCUMENTS

| | | | |
|---|---|---|---|
| 3,952,711 | 4/1976 | Kimberely et al. | 239/533.2 |
| 4,498,626 | 2/1985 | Schechter | 239/5 |
| 4,531,672 | 7/1985 | Smith | 239/89 |
| 4,618,095 | 10/1986 | Spoolstra | 239/90 |
| 4,811,899 | 3/1989 | Egler | 239/5 |
| 4,984,738 | 1/1991 | Winquist | 239/88 |
| 5,199,641 | 4/1993 | Hohm et al. | 239/102.2 |
| 5,203,538 | 4/1993 | Matsunaga et al. | 251/129.19 |
| 5,219,122 | 6/1993 | Iwanaga | 239/533.8 |
| 5,524,826 | 6/1996 | Mueller et al. | 239/533.9 X |
| 5,538,187 | 7/1996 | Mueller et al. | 239/533.9 X |

Primary Examiner—Andres Kashnikow
Assistant Examiner—Robin O. Evans
Attorney, Agent, or Firm—Liell & McNeil

[57] ABSTRACT

A method of fuel injection comprises the initial step of providing a fuel injector with a solenoid actuated control valve mounted in an actuation fluid cavity. The valve is biased to a first position but movable to a second position against the bias when the solenoid is energized. When in its first position, the actuation fluid cavity is opened to a high pressure actuation fluid inlet, but opened to a low pressure fluid actuation fluid drain when in its second position. In the next step, the desired amount of fuel to be injected is determined. An actuation duration for the solenoid corresponding to the desired amount of fuel is calculated. Then, it is determined whether the actuation duration corresponds to a cavitation zone of operation for the control valve. Next an injection event is initiated by moving the valve to open the actuation fluid cavity to the high pressure actuation fluid inlet. After the actuation duration, the control valve is moved toward the position that opens the low pressure actuation fluid drain. If it is determined that the injector was operating within the cavitation zone of operation, then the movement rate of the control valve while closing is slowed while it is moving to close the high pressure actuation fluid inlet. This slowing of the valve's closure sufficiently alters conditions within the injector that pressure does not drop to cavitation levels.

5 Claims, 2 Drawing Sheets

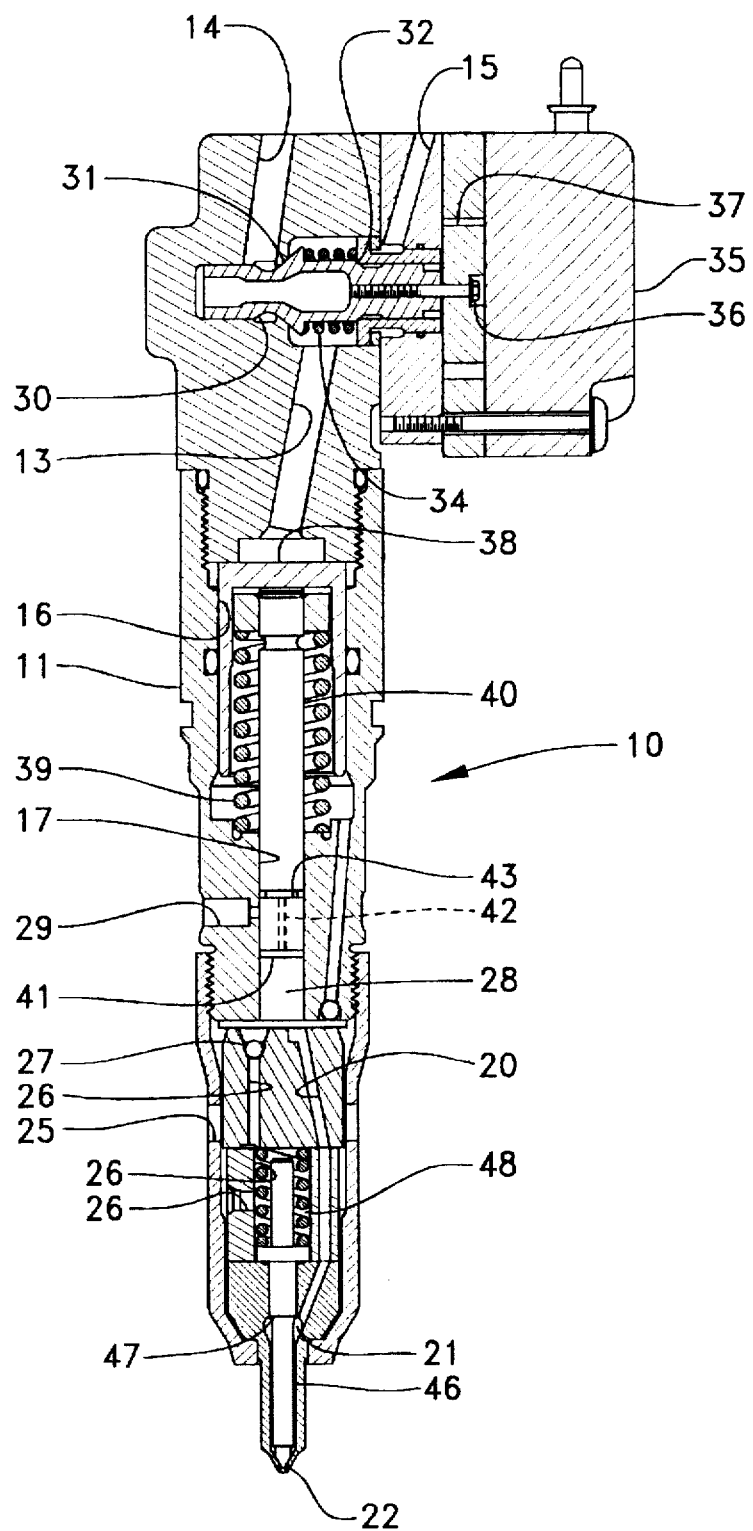
Fig_1

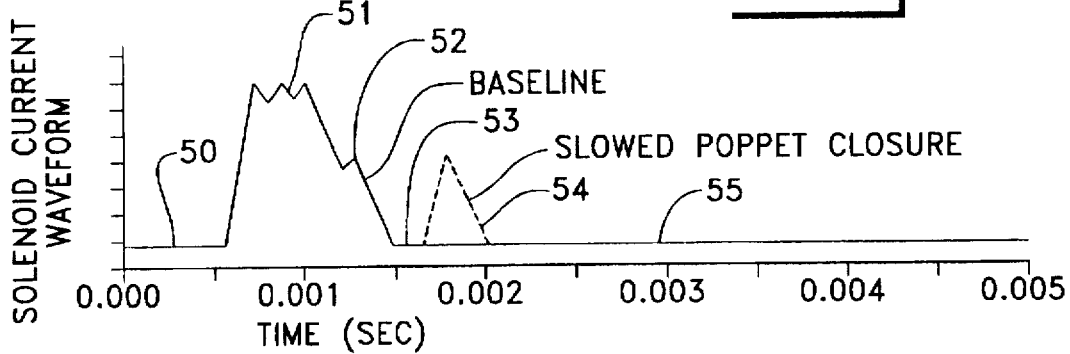
Fig_2_
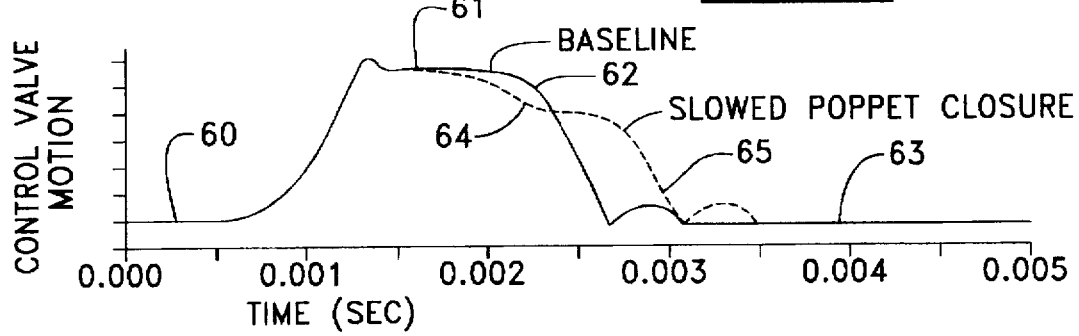
Fig_3_
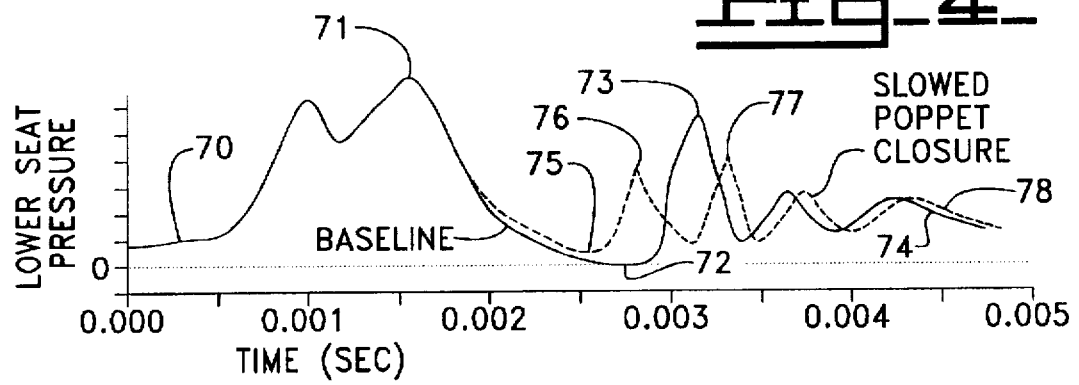
Fig_4_
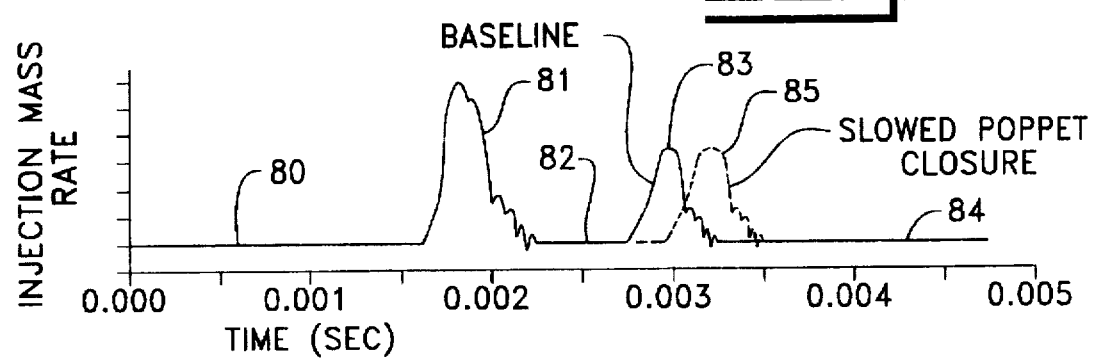
Fig_5_

5,788,154

1

METHOD OF PREVENTING CAVITATION IN A FUEL INJECTOR HAVING A SOLENOID ACTUATED CONTROL VALVE

TECHNICAL FIELD

The present invention relates generally to solenoid actuated control valves for fuel injectors, and more particularly to a method of preventing cavitation during the operation of a fuel injector having a solenoid actuated control valve.

BACKGROUND ART

In many hydraulically actuated fuel injectors, a solenoid actuated control valve is used to initiate and end each injection event. In these injectors, such as those manufactured by Caterpillar, Inc., the control valve is utilized to alternately open and close an actuation fluid cavity to a high pressure actuation fluid inlet and a low pressure actuation fluid drain. When the high pressure inlet is opened in order to initiate an injection event, high pressure fluid, such as lubricating oil, flows into the injector and hydraulically pushes an intensifier piston. The intensifier piston in turn pushes a plunger that compresses the fuel, which causes the needle check to lift to allow fuel to exit the nozzle. The injection event is ended when the solenoid is de-energized and the control valve moves under a bias to close the high pressure inlet and open the actuation fluid cavity to the low pressure drain. Unfortunately, cavitation damage sometimes occurs in the vicinity of the high pressure valve seat when it is closing at the end of an injection event.

In one specific example, cavitation damage occurs at the high pressure valve seat because the valve is closing at the same time that the actuation fluid cavity is expanding due to the downward momentum of the intensifier piston. Under extreme conditions, the fluid pressure near the valve seat can drop so low that cavitation vapor bubbles appear near the valve seat. As the fluid demands of the actuation fluid cavity decrease with a slowing and eventual stop of the intensifier piston, the cavitation bubbles collapse and cause undesirable wear on the high pressure valve seats. Over time, this cavitation wear can undermine the performance and proper operation of a fuel injector.

In most cases, these cavitation problems are discovered after an injector has reached a final design stage and is being manufactured. The reason for this being that the injector typically exhibits cavitation problems over only a very narrow range of its operation. Also, a significant number of field hours are often required before the cavitation erosion becomes visible and begins to create performance problem. While cavitation problems such as these could be addressed by re-designing various components of the injector, there is a significant chance that another cavitation problem might then reveal itself in a different zone of operation for the solenoid actuated control valve of the injector. The reason being that cavitation problems are often due to complex dynamically related variables, such as valve seat and cavity shapes, control valve motion, piston motion, etc.

The present invention is directed to avoiding cavitation problems in hydraulically actuated fuel injectors without resorting to relatively expensive and uncertain hardware redesigns.

DISCLOSURE OF THE INVENTION

In order to avoid cavitation problems, the present invention contemplates altering the operation of the fuel injector in that zone of operation in which cavitation occurs.

2

However, it is important that any change in the injector's operation in the cavitation zone not be so profound as to significantly change the expected injection mass flow rate out of the injector. The present invention accomplishes this by operating the fuel injector substantially identical to a method of the prior art, except that the normal closure rate of the solenoid actuated control valve is slowed while the valve is moving to close the high pressure actuation fluid inlet. Oftentimes a brief flow of current to the solenoid is sufficient to slow the movement of the control valve and change the dynamic conditions occurring at the high pressure seat sufficiently to avoid the development of low cavitation pressures. It has been found that this method of avoiding cavitation problems can be introduced without significantly altering injection mass flow rate and volume out of the injector.

One object of the present invention is to avoid cavitation in the operation of hydraulically actuated fuel injectors.

Another object of the present invention is to avoid cavitation problems without significantly altering the fuel injector's performance.

Still another object of the present invention is to avoid cavitation in a fuel injector without design changes to its physical structure.

BRIEF DESCRIPTION OF THE DRAWINGS

FIG. 1 is a section side elevational view of an example fuel injector upon which the method of the present invention can be practiced.

FIG. 2 is a graph of solenoid current wave form versus time for a single injection event with and without the method of the present invention.

FIG. 3 is a corresponding graph of the control valves' motion over the same time period with and without the present invention.

FIG. 4 is a graph of lower seat pressure versus time for the same time period with and without the present invention.

FIG. 5 is a graph of injection mass flow rate versus time for the same time period with and without the present invention.

DETAILED DESCRIPTION OF THE PREFERRED EMBODIMENT

Referring now to FIG. 1, an example hydraulically actuated fuel injector 10 is illustrated. The injector includes an injector body 11 having an actuation fluid cavity 13 that opens to a high pressure actuation fluid inlet 14, a low pressure actuation fluid drain 15 and a piston bore 16. The piston bore is adjacent to a plunger bore 17, which opens to a fuel supply passage 26 and a nozzle supply passage 20. The nozzle supply passage opens to a nozzle chamber 21, which opens to nozzle outlet 22. A control valve 30 is attached to an armature 37 of a solenoid 35 via a screw 36. A compression spring 34 mounted about control valve 30 biases the valve member such that high pressure seat 31 normally closes high pressure actuation fluid inlet 14. When solenoid 35 is energized, the control valve moves to the right against the action of biasing spring 34 to open actuation fluid cavity 13 to the high pressure inlet 14. At the same time, the low pressure seat 32 closes the actuation fluid cavity 13 to the low pressure actuation fluid drain 15.

An intensifier piston 38 is positioned to reciprocate within piston bore 16 between a retracted position, as shown, and an advanced position. A plunger 40 is mounted to reciprocate in plunger bore 17 between a retracted position, as shown, and an advanced position. One end of the plunger is in contact with the underside of piston 38, so that both move in unison. A portion of plunger bore 17 and a pressure face end 41 of plunger 40 define a fuel pressurization chamber 28. The plunger includes a priming port 42 that opens to an annulus 43 that is usually closed but aligns with a spill port 29 over a portion of the plunger's downward stroke.

A needle check 46 is positioned within nozzle chamber 21 and is capable of moving between a closed position that closes nozzle outlet 22 and an open position that opens the nozzle outlet. A check return spring 48 normally biases needle check 46 to its closed position. However, needle check 46 lifts to open nozzle outlet 22 when fuel pressure acting on lift surface 47 is sufficient to overcome biasing spring 48.

Each injection event is initiated by energizing solenoid 35 to move control valve 30 to a position that opens actuation fluid cavity 13 to high pressure actuation fluid inlet 14. High pressure fluid then begins to flow into cavity 13 and act upon intensifier piston 38 causing it to begin its downward stroke. Both intensifier piston 38 and plunger 40 begin their downward stroke against the action of return spring 39. Downward movement of plunger 40 causes the fuel within fuel pressurization chamber 28 to be compressed. Very soon after the plunger begins its downward stroke, the fuel pressure within fuel pressurization chamber 28 and nozzle chamber 21 is sufficient to lift the needle check to open nozzle outlet 22. A short time later, annulus 43 opens to spill port 29 causing an abrupt drop in fuel pressure within fuel pressurization chamber 28 and nozzle chamber 21. This pressure drop causes needle check 46 to close and the downward rate of piston 38 and plunger 40 to accelerate due to the lack of resistance in fuel pressurization chamber 28. As the plunger continues its downward motion, annulus 43 moves past spill port 29 closing fuel pressurization chamber 28 to the spill port. This causes the pressure in fuel pressurization chamber 28 to quickly rise and reopen needle check 46 for the main injection portion of the injection event. At the same time, the increased pressure within fuel pressurization chamber 28 causes the downward movement of piston 38 and plunger 40 to decelerate and resume a slower downward velocity.

The injection event is terminated by de-energizing solenoid 35 to allow control valve 30 to move high pressure seat 31 to close high pressure actuation fluid inlet 14 and open the low pressure actuation fluid drain 15. When this occurs, the hydraulic pressure acting upon intensifier piston 38 vanishes. Nevertheless, the downward movement of intensifier piston 38 and plunger 40 continues briefly due to their forward momentum. The slowing and eventual stop of plunger 40 causes a drop in fuel pressure within fuel pressurization chamber 28 and nozzle chamber 21 so that needle check 46 can close and cease the injection of fuel. Between injection events, return spring 49 causes plunger 40 and piston 38 to retract back to the position shown. At this time, fuel flows into the injector through opening 25 along fuel supply passage 26, past check valve 27 and into fuel pressurization chamber 28 for the next injection event.

It has been found that in some instances the continued downward motion of intensifier piston 38 due to its own momentum, after the control valve has been de-energized, can actually cause actuation fluid cavity 13 to be expanding faster than fluid can be supplied thereto. When this flow condition becomes acute, cavitation vapor bubbles can form within actuation fluid cavity 13 and especially in the vicinity of high pressure seat 31. When the fluid demands of actuation fluid cavity 13 quickly drops with the stopping and eventually retracting motion of intensifier piston 38, the cavitation bubbles abruptly collapse causing erosion in the vicinity of the collapse. Over time this can cause serious damage to the high pressure seat 31, eventually undermining the performance and operation of injector 10. This cavitation phenomenon has been observed to occur when injector 10 is injecting an amount of fuel corresponding to a high rpm, low load condition on the engine. Thus, for the injector shown in FIG. 1, the cavitation zone of operation corresponds to a high rpm, low load condition, and the corresponding amount of fuel therefore. Those skilled in the art will appreciate that a computer typically senses engine load and operating conditions and determines a desired amount of fuel to be injected. Based upon the desired amount of fuel to be injected, an activation duration for the solenoid 35 is calculated.

Referring now to FIGS. 2–5, various variables relating to the fuel injector shown in FIG. 1 are graphed over a single injector cycle time period. In this case, the time period corresponds to a single injection event at high rpm, low load conditions. Before the injection event begins, no current 50 is flowing to solenoid 35. When the injection event is initiated a relatively high current 51 is sent to the solenoid. Higher current is used at the beginning of each injection because the control valve 30 is being moved from a stop off its lower seat. After a brief period of time, the solenoid current wave form drops to a lower level 52, which is sufficient to keep the control valve 30 moving and/or held in a position that closes lower pressure seat 32 and low pressure drain 15. After the activation duration corresponding to the desired amount of fuel has elapsed, current to the solenoid ceases for relatively long period 55 between injection events. FIG. 3 shows the control valves motion over the same time period as in FIG. 2. The control valve begins in its biased position 60 but quickly moves to a fully opened position under the action of the solenoid 35. After the current to the solenoid is stopped, the control valve begins its movement 62 toward a closed position 63. FIG. 4 shows in the base line the lower seat pressure building from a low point 70 up to a peak 71. At about the time that the control valve is bouncing off its closed position, the lower seat pressure drops to cavitation levels at point 72 then quickly spikes again to point 73 and eventually settles back to a returned lower pressure 74. It is the portion of the curve at area 72 that the present invention seeks to alter so that cavitation pressure levels do not occur.

FIG. 2 shows that in the case of the present invention the solenoid current wave form is identical to that of the baseline prior art except that it includes an additional current spike 54 that is intended to slow the closure rate of the control valve. This slower closure rate is reflected in curve portions 64 and 65 of FIG. 3. FIG. 4 shows that this slight alteration in the control valves closing motion results in the pressure at the lower seat never dropping to cavitation levels. Instead, the curve upturns at point 75 and experiences two relative peaks in pressure 76 and 77 before eventually settling out to a lower pressure 78. FIG. 5 shows the injection mass flow rate with and without the solenoid wave form of the present invention. In particular, the curve begins with no fuel being injected 80 and then a pilot injection 81 occurs followed by a brief cessation in injection 82 corresponding to when prime port 42 communicates with spill port 29 via annulus 43 (See FIG. 1). A short time later the baseline main injection 83 occurs followed by a cessation 84 in injection until the next injection event. The injection profile with the slowed poppet closure of the present invention is virtually identical except that main injection 85 occurs a small fraction of a second later than it occurs in the baseline operation. This small delay does not significantly alter the performance of the engine, and the total amount of fuel injected with and without the present invention is virtually identical. The delay can be adjusted (shortened) by reducing the height of annulus 43.

This cavitation phenomenon in this example case occurs at the low load high rpm condition apparently because the poppet valve is closing when the piston and plunger are moving relatively fast after having passed through the opening of spill port 29 to the fuel pressurization chamber 28. In the other zones of the injector's operation, the intensifier piston is not moving sufficiently fast when the valve closes to create the conditions for cavitation. Thus, with a slight "software change" the cavitation problems which would otherwise occur are eliminated.

Industrial Applicability

In practice, the present invention is preferably implemented only after a cavitation problem has been identified. Once cavitation has occurred, the particular zone of operation for the injector, its cavitation zone, should be identified. In most cases, this can be accomplished by placing sensors at appropriate locations within a test injector and then observing fluid pressures as the injector is operated in various zones of operation. Once the cavitation zone is identified, the control logic for the solenoid actuated control valve is then changed in this zone to add the current pulse of the present invention while the valve member is moving between positions. Thus, when in operation, the computer controlling the solenoid determines whether the desired amount of fuel to be injected corresponds to the cavitation zone of operation for the fuel injector. If so, the computer commands a current pulse to the solenoid to slow the valve member's movement according to the present invention.

Although the present invention has been illustrated in relation to a hydraulically actuated fuel injector, the principles of the present invention could be applied to any solenoid actuated valves in which cavitation is observed when the valve is commanded to close after a relatively large flow has been established through the valve. In addition, in some cases the control logic for the control valve is reversed when the high pressure inlet is reversed with the low pressure fluid drain. In such a case, injection is initiated by de-energizing the solenoid and the injection event is terminated by energizing the solenoid. In such a case, if cavitation occurs upon closure, the present invention would prescribe a brief de-energization of the solenoid while the valve is closing in order to slow its movement to eliminate the cavitation.

Those skilled in the art will appreciate that the above description is intended for illustrative purposes only in the context of an example injector in which a cavitation phenomenon has been known to occur. In any event, the actual scope of the present invention is to be determined solely in terms of the claims as set forth below.

I claim:

1. A method of fuel injection comprising the steps of:
providing a fuel injector with a solenoid actuated control valve mounted in an actuation fluid cavity that is biased to a first position but movable to a second position against the bias when the solenoid is energized, and the actuation fluid cavity is open to a high pressure actuation fluid inlet when the control valve is in one of either said first position or said second position and open to a low pressure actuation fluid drain when in the other of said first position or said second position;

determining a desired amount of fuel to be injected;

calculate an actuation duration corresponding to said desired amount of fuel;

determining whether said actuation duration corresponds to a cavitation zone of operation for said control valve;

moving said control valve to a position that opens said actuation fluid cavity to said high pressure actuation fluid inlet for said actuation duration;

moving said control valve toward a position that opens said actuation fluid cavity to said low pressure actuation fluid drain; and if within said cavitation zone of operation then slowing the movement rate of said control valve while said high pressure actuation fluid inlet is closing and said low pressure actuation fluid drain is opening.

2. The method of claim 1 wherein said high pressure actuation fluid in inlet is closed when said control valve is in said first position but open when said control valve is in said second position;

said step of moving said control valve to a position that opens said actuation fluid cavity to said high pressure actuation fluid inlet is accomplished by energizing said solenoid actuated control valve;

said step of moving said control valve toward a position that opens said actuation fluid cavity to said low pressure actuation fluid drain is accomplished by de energizing said solenoid actuated control valve;

said step of slowing the movement rate of said control valve is accomplished by energizing said solenoid actuated control valve against the action of said bias for a time period sufficiently long to slow the movement rate of said control valve while moving from said second position to said first position.

3. The method of claim 1 wherein said high pressure actuation fluid inlet is open when said control valve is in said first position but closed when said control valve is in said second position;

said step of moving said control valve to a position that opens said actuation fluid cavity to said high pressure actuation fluid inlet is accomplished by de energizing said solenoid actuated control valve;

said step of moving said control valve toward a position that opens said actuation fluid cavity to said low pressure actuation fluid drain is accomplished by energizing said solenoid actuated control valve;

said step of slowing the movement rate of said control valve is accomplished by de energizing said solenoid actuated control valve for a time period sufficiently long to slow the movement rate of said control valve while moving from said first position to said second position, and then re energizing said solenoid actuated control valve.

4. A method of preventing cavitation in a solenoid actuated control valve for a fuel injector comprising the steps of:

providing a fuel injector with a solenoid actuated control valve mounted in an actuation fluid cavity;

energizing the solenoid for a first time period that is sufficiently long to move the control valve to a first position that opens the actuation fluid cavity to a high pressure actuation fluid inlet and closes the actuation fluid cavity to a low pressure actuation fluid drain;

de-energizing the solenoid for a second time period that is sufficiently long to allow a biasing means to move the control valve from said first position toward a second position that closes the actuation fluid cavity to the high pressure actuation fluid inlet and opens the actuation fluid cavity to the low pressure actuation fluid drain; and re-energizing the solenoid before the control valve reaches its second position for a third period of time sufficiently long to slow the movement rate of the control valve but sufficiently short that the control valve continues moving toward the second position.

5. A method of preventing cavitation in a solenoid actuated control valve for a fuel injector comprising the steps of:

providing a fuel injector with a solenoid actuated control valve mounted in an actuation fluid cavity;

de-energizing the solenoid for a first time period that is sufficiently long to allow the control valve to move under the action of a bias to a first position that opens the actuation fluid cavity to a high pressure actuation fluid inlet and closes the actuation fluid cavity to a low pressure actuation fluid drain;

energizing the solenoid for a second time period that is sufficiently long to begin moving the control valve from said first position toward a second position that closes the actuation fluid cavity to the high pressure actuation fluid inlet and opens the actuation fluid cavity to the low pressure actuation fluid drain;

de-energizing the solenoid before the control valve reaches its second position for a third period of time sufficiently long to slow the movement rate of the control valve but sufficiently short that the control valve continues moving toward the second position; and re-energizing the solenoid until the control valve reaches said second position.

* * * * *